US009924822B1

(12) United States Patent
Reese

(10) Patent No.: US 9,924,822 B1
(45) Date of Patent: Mar. 27, 2018

(54) SPHERICAL ORNAMENT

(71) Applicant: Christopher Thomas Reese, Duluth, GA (US)

(72) Inventor: Christopher Thomas Reese, Duluth, GA (US)

( * ) Notice: Subject to any disclaimer, the term of this patent is extended or adjusted under 35 U.S.C. 154(b) by 0 days.

(21) Appl. No.: 15/255,995

(22) Filed: Sep. 2, 2016

(51) Int. Cl.
*G02B 5/08* (2006.01)
*A47G 33/08* (2006.01)
*G02B 5/09* (2006.01)
*G02B 7/182* (2006.01)
*G02B 1/02* (2006.01)

(52) U.S. Cl.
CPC ............... *A47G 33/08* (2013.01); *G02B 1/02* (2013.01); *G02B 5/09* (2013.01); *G02B 7/182* (2013.01)

(58) Field of Classification Search
CPC ... G02B 1/02; G02B 5/09; G02B 7/18; G02B 7/182; G02B 5/08; A47G 33/08; A47G 33/10; A47G 1/12; B44C 3/12
USPC .......................................................... 359/850
See application file for complete search history.

(56) References Cited

U.S. PATENT DOCUMENTS 1,014,958 A 1/1912 Edison
1,918,123 A 7/1933 Newman
2,039,394 A 5/1936 Dalton
3,119,565 A 1/1964 Nottingham
3,533,890 A 10/1970 Nesbit
3,757,442 A 9/1973 Cook
4,250,537 A 2/1981 Roegner
4,860,477 A 8/1989 Gooch
4,907,704 A 3/1990 Souders
4,991,851 A 2/1991 Melesio
5,009,333 A 4/1991 Souders
5,546,226 A 8/1996 Herington
5,645,343 A 7/1997 Rinehimer
6,196,782 B1 3/2001 Wagner et al.
6,221,267 B1 4/2001 Ikeda et al.
6,285,472 B1 10/2001 Odhner et al.
6,461,216 B1 10/2002 Applewhite et al.
6,474,843 B2 11/2002 Shieh
7,557,975 B2 7/2009 DeBenedictis et al.
8,128,259 B2 3/2012 Myers et al.
8,166,689 B1 5/2012 Emshoff
8,425,084 B2 * 4/2013 Myers ........................ B44C 3/12 362/249.01
8,696,156 B2 4/2014 Yuan et al.

* cited by examiner

*Primary Examiner* — Euncha Cherry
(74) *Attorney, Agent, or Firm* — Asgaard Patent Services, LLC; F. Wayne Thompson, Jr.

(57) ABSTRACT

Implementations of a spherical ornament are provided. In some implementations, the spherical ornament may include a plurality of light reflecting assemblies that are configured to reflect visible light and thereby create a visual phenomenon. In some implementations, the spherical ornament may be used in conjunction with one or more external light sources to create a reflected light display. In some implementations, the spherical ornament may comprise a body portion having a plurality of light reflecting assemblies mounted thereon. In some implementations, each light reflecting assembly may comprise a light reflecting element that is held by a setting. In some implementations, the setting may include a post that is configured to be inserted into the body portion of the spherical ornament and thereby mount the light reflecting assembly thereon.

20 Claims, 10 Drawing Sheets

SPHERICAL ORNAMENT

TECHNICAL FIELD

This disclosure relates to implementations of a spherical ornament and methods of assembling spherical ornaments.

BACKGROUND

Ornaments are routinely used as decorations for Christmas trees, as garden decorations, and to embellish other objects (e.g., a statue). A bauble is a common spherical decoration used to adorn a Christmas tree. Baubles are often made of colored plastic or glass and may have a shiny exterior that reflects light.

However, the prior art fails to disclose a bauble or other ornament that has the same structure as the spherical ornament disclosed herein. The prior art is also silent in regards to the method(s) used to assemble the spherical ornament disclosed herein.

SUMMARY OF THE INVENTION

Implementations of a spherical ornament are provided. In some implementations, the spherical ornament may include a plurality of light reflecting assemblies that are configured to reflect visible light and thereby create a visual phenomenon. In some implementations, the spherical ornament may be used in conjunction with one or more external light sources (e.g., a lamp). In this way, a reflected light display may be created by the light that is reflected by the light reflecting assemblies of the spherical ornament.

In some implementations, the spherical ornament may comprise a body portion having a plurality of light reflecting assemblies mounted thereon. In some implementations, each light reflecting assembly may comprise a light reflecting element that is held by a setting. In some implementations, the setting may include a post that is configured to be inserted into the body portion of the spherical ornament and thereby mount the light reflecting assembly thereto.

In some implementations, the body portion may be formed of a resilient material (e.g., polyurethane foam) having self-healing properties. "Self-healing" means that the selected material has the ability to at least partially repair (e.g., visually obscure) damage caused by mechanical usage (e.g., punctures) over time. In some implementations, the body portion may be formed of a material having a density sufficient to retain the post of a setting therein.

In some implementations, the top half of the spherical ornament may have a first light reflecting assembly mounted in the center thereof. In some implementations, on the top half of the body portion, several concentric rings of light reflecting assemblies may be positioned about the first light reflecting assembly and mounted on the body portion of the spherical ornament. In some implementations, light reflecting assemblies are mounted on the bottom half of the spherical ornament in an identical, or nearly identical, manner as the light reflecting assemblies mounted on the top half of the spherical ornament.

In some implementations, one or more secondary light reflecting assemblies may be used to further accent the spherical ornament and/or to create designs and/or patterns thereon. In some implementations, the secondary light reflecting assemblies are smaller in diameter and/or size relative to the other light reflecting assemblies used to construct a spherical ornament.

In some implementations, a spherical ornament may be provided to a user as a self-assemble kit comprised of a spherical body portion, a plurality of light reflecting assemblies, and/or a plurality of secondary light reflecting assemblies.

DETAILED DESCRIPTION

Figure 1:
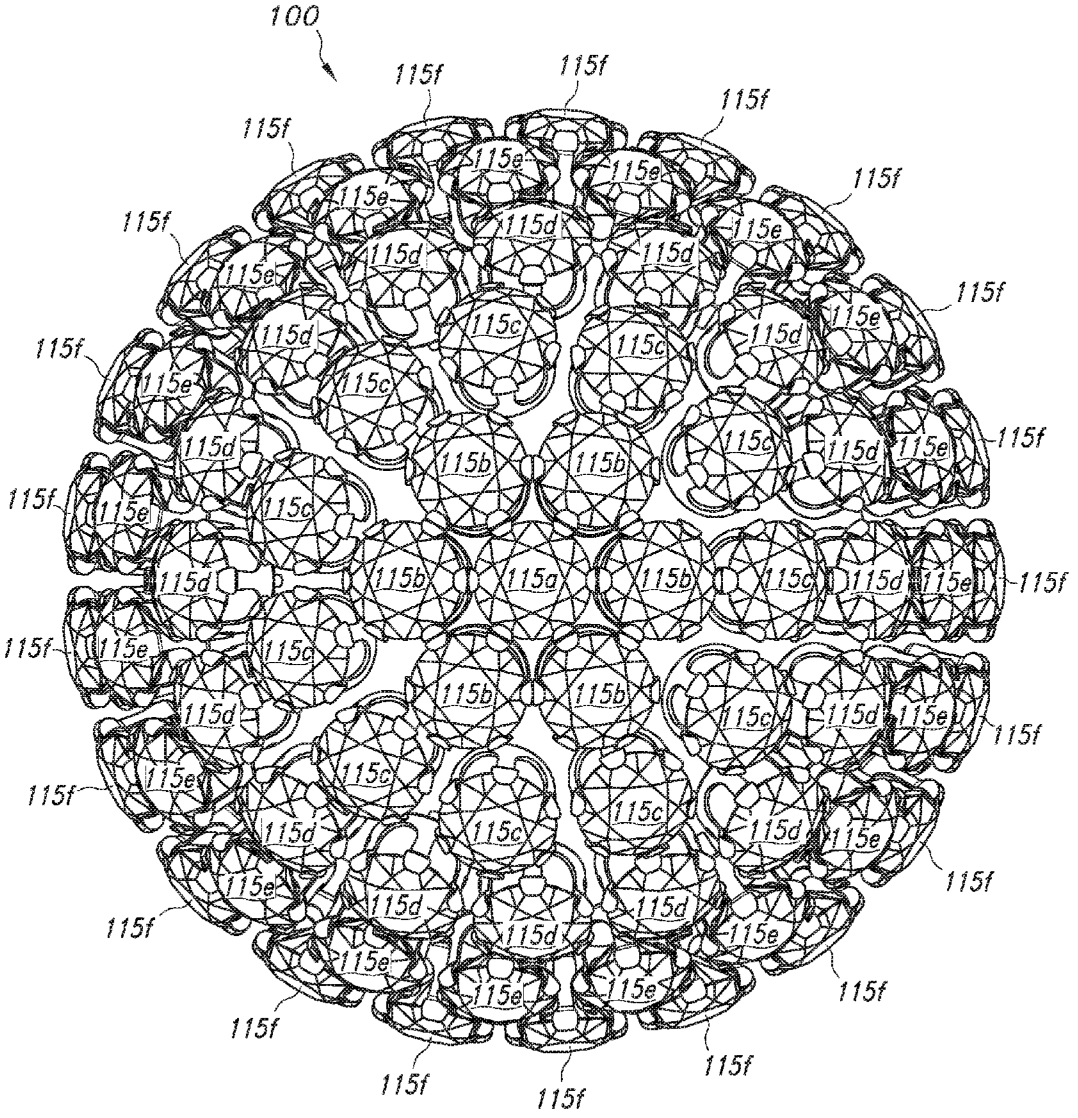
FIG. 1 illustrates a top view of the spherical ornament according to the principles of the present disclosure.
Figure 2:
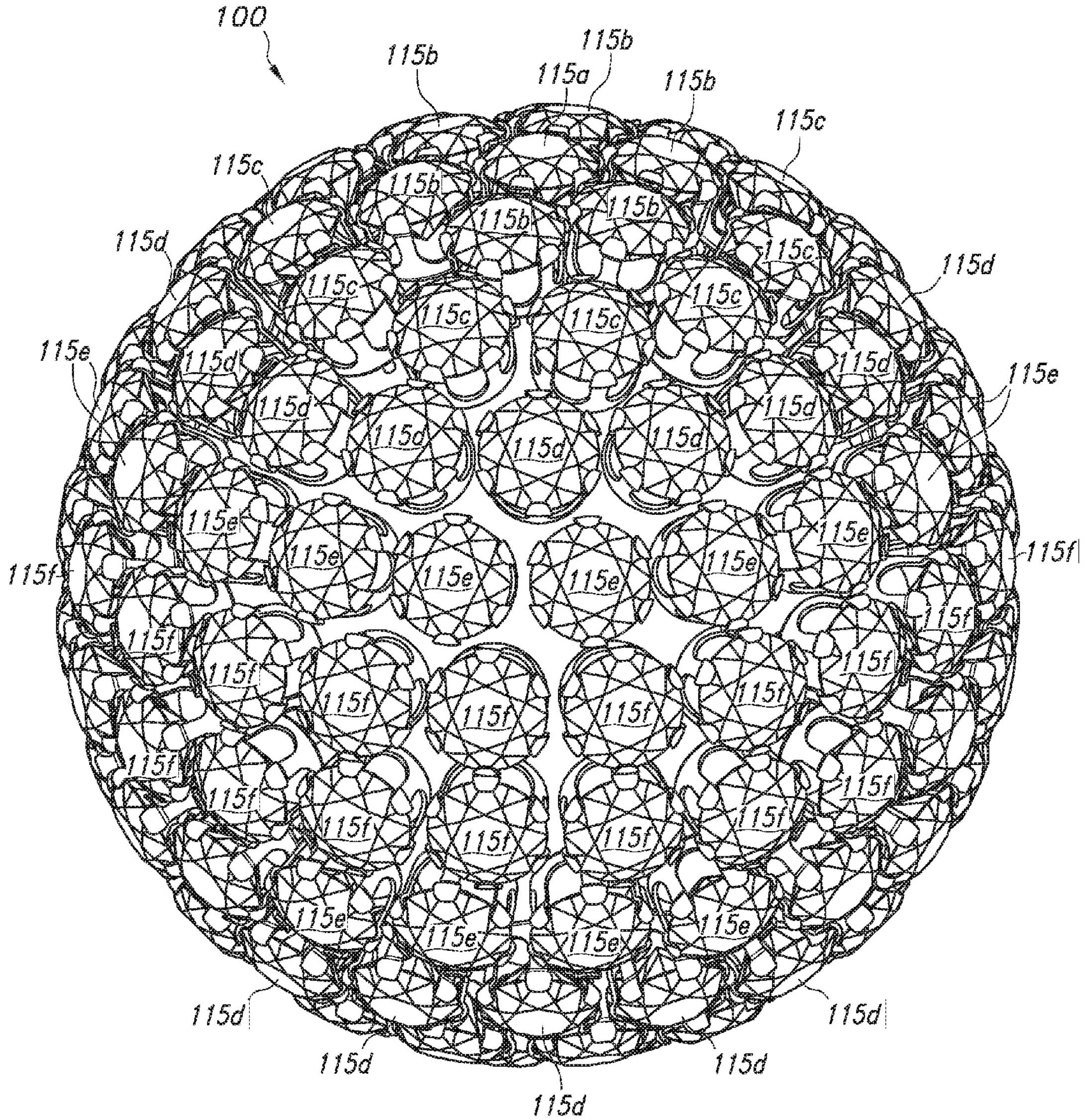
FIG. 2 illustrates an isometric view of the spherical ornament shown in FIG. 1.

FIGS. 1-3 and 8 illustrate an example spherical ornament 100 according to the present disclosure. In some implementations, the spherical ornament 100 may include a plurality of light reflecting assemblies 115 that are configured to reflect visible light and thereby create a visual phenomenon within the surrounding environment (e.g., a room). In some implementations, the spherical ornament 100 may be used in conjunction with one or more external light sources (e.g., a lamp). In this way, a reflected light display may be created by the light (e.g., light from an external light source) that is reflected by the light reflecting assemblies 115 of the spherical ornament 100. In some implementations, the spherical ornament 100 may be rotated about its central axis on a turntable (not shown). In this way, the reflected light display created by the spherical ornament 100 may be made to spin or rotate in a direction that corresponds to the movement of the turntable.

As shown in FIGS. 1-3 and 8, in some implementations, the spherical ornament 100 may comprise a body portion 105 having a plurality of light reflecting assemblies **115*a*, 115*b*, 115*c*, 115*d*, 115*e*, 115*f* (collectively light reflecting assemblies 115) mounted thereon. In some implementations, each light reflecting assembly 115 may comprise a light reflecting element 120 that is held by a setting 125 (see, e.g., FIG. 4). In some implementations, the setting 125 may be used to mount the light reflecting element 120 on the body portion 105 of the spherical ornament 100 (see, e.g., FIG. 6**).

Figure 6:
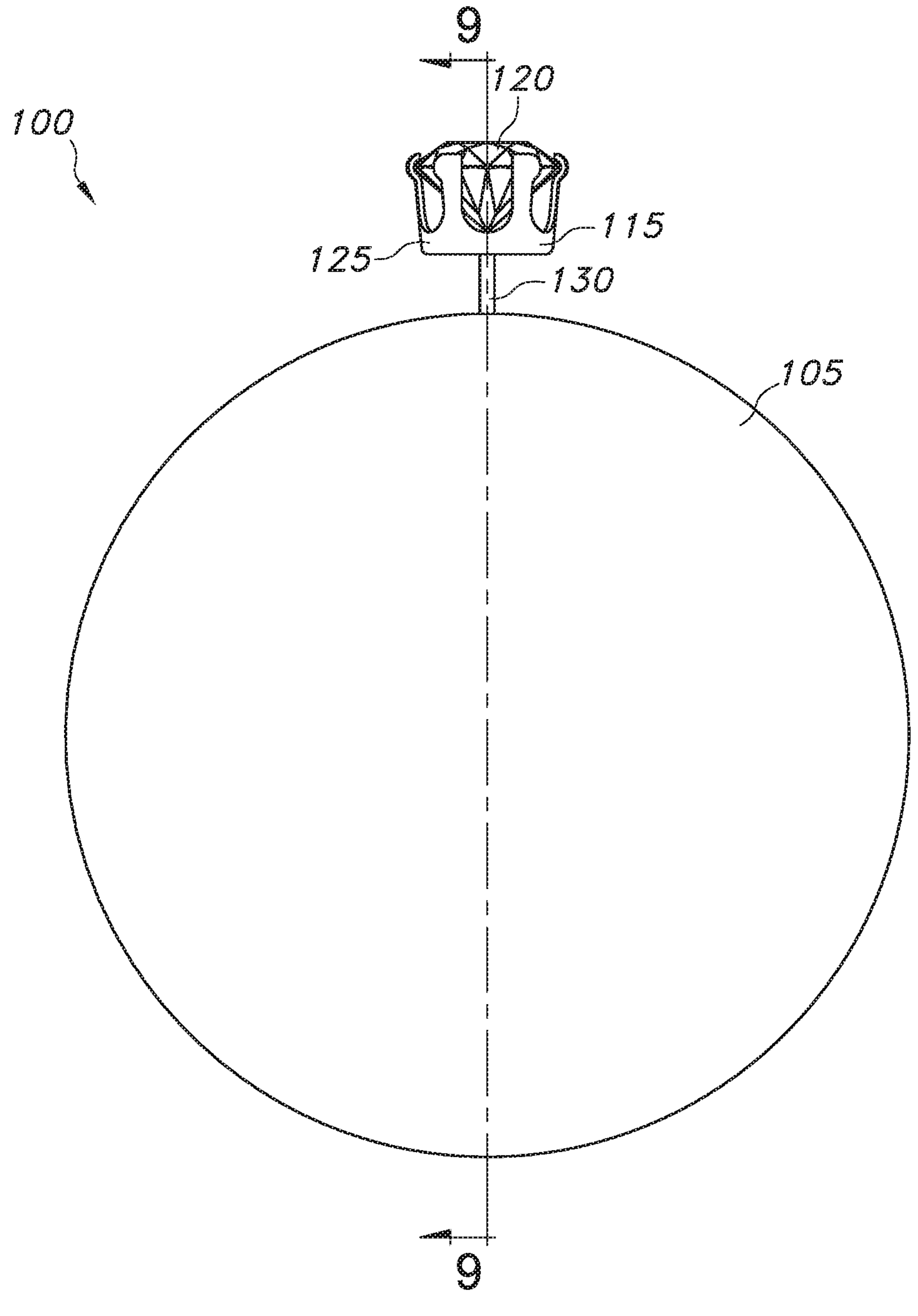
FIG. 6 illustrates a side view of the spherical ornament in which one light reflecting assembly has been mounted to the body portion thereof.
Figure 7:
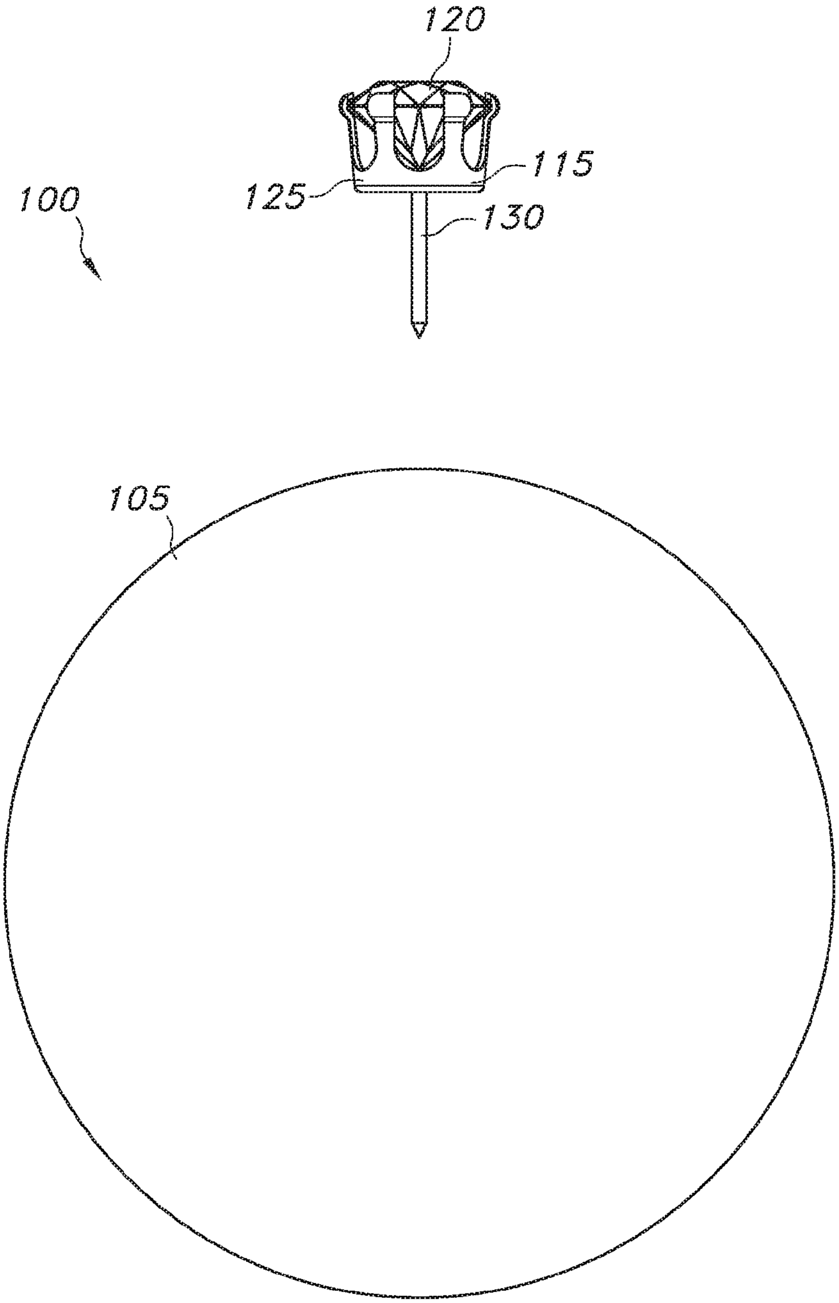
FIG. 7 illustrates an exploded view of the spherical ornament shown in FIG. 6.
Figure 8:
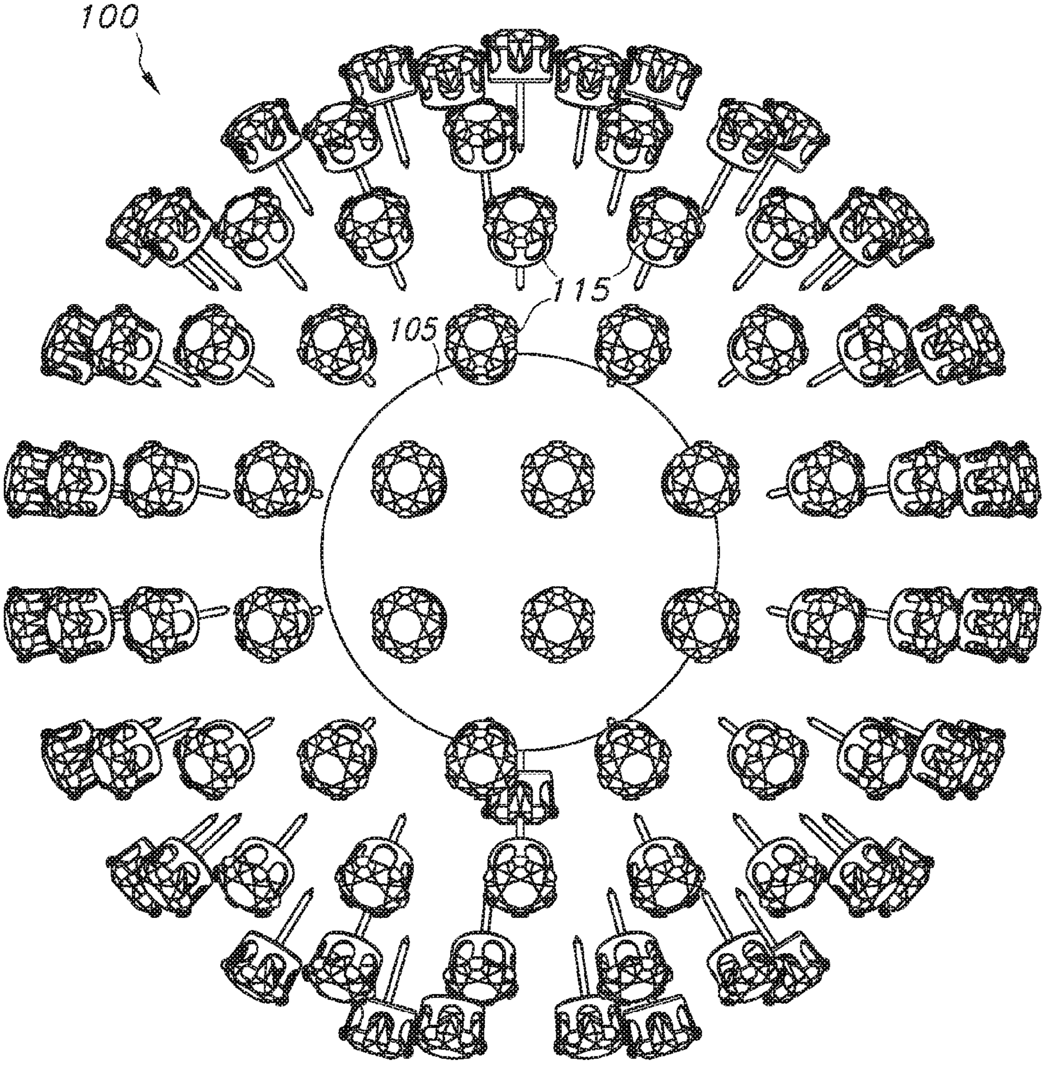
FIG. 8 illustrates an exploded view of the spherical ornament shown in FIG. 3.

As shown in FIGS. 6 and 7, in some implementations, the body portion 105 may be spherical. In some implementations, the body portion 105 may be a single unitary piece (see, e.g., FIGS. 6 and 9). In some implementations, the body portion 105 may be formed as two hemispherical sections (not shown). In some implementations, the body portion 105 may be a solid sphere (see, e.g., FIG. 9). In some implementations, the body portion 105 may be a hollow sphere (not shown). In some implementations, the exterior (or working surface) of the body portion 105 will have a depth sufficient to grip and/or retain the post 130 (discussed in greater detail below) of a setting 125 (see, e.g., FIGS. 6 and 9). In this way, a light reflecting assembly 115 may be secured to the body portion 105 of the spherical ornament 100.

In some implementations, the body portion 105 may be formed of a resilient material (e.g., polyurethane foam) having self-healing properties. "Self-healing" means that the selected material has the ability to at least partially repair (e.g., visually obscure) damage caused by mechanical usage (e.g., a puncture 132, see FIG. 9) over time. In some implementations, the body portion 105 may be formed of a material having a density sufficient to retain the post 130 of a setting 125 therein (see, e.g., FIG. 9). In some implementations, the body portion 105 may be manufactured from a natural rubber or a synthetic rubber (e.g., polyurethane). In some implementations, the body portion 105 may be manufactured from any material (natural or synthetic) having self-healing properties that would otherwise be suitable (e.g., density) for use as the body portion 105 of the spherical ornament 100 disclosed herein.

In some implementations, the body portion 105 may be 57 mm in diameter. In some implementations, the body portion 105 may be more than 57 mm in diameter or less than 57 mm in diameter.

Figure 4:
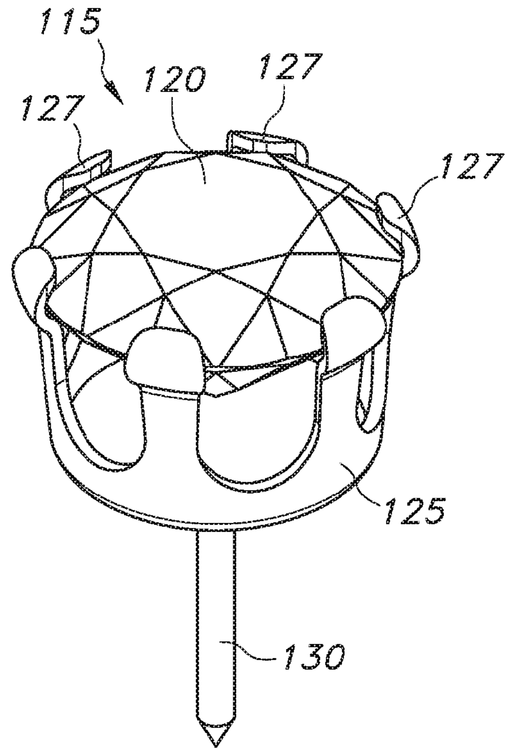
FIG. 4 illustrate an isometric view of a light reflecting assembly comprised of a light reflecting element and a setting according to the principles of the present disclosure.
Figure 5:
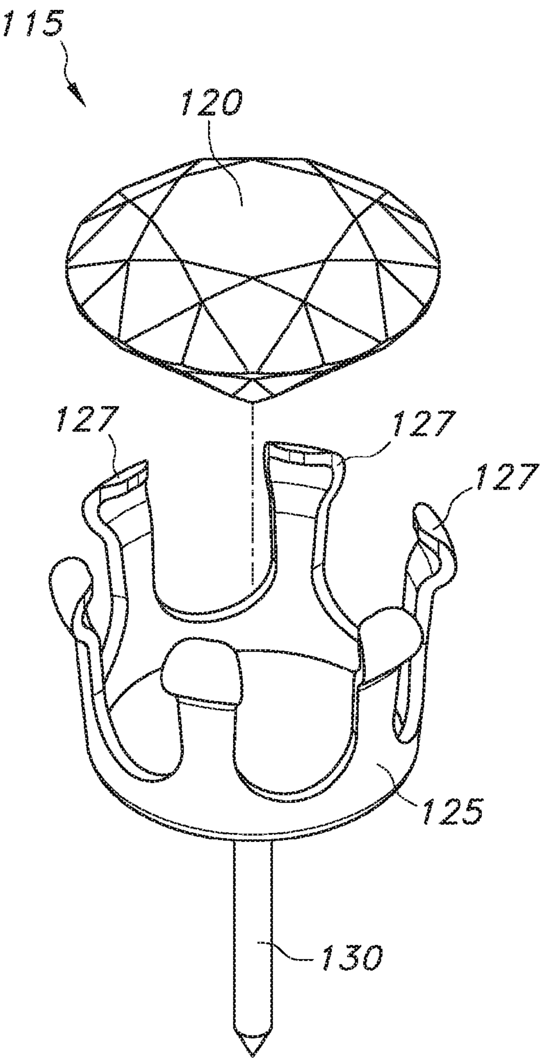
FIG. 5 illustrates an exploded view of the light reflecting assembly shown in FIG. 4.

As shown in FIGS. 4 and 5, a light reflecting element 120 may include one or more light reflective surfaces thereon. In some implementations, a light reflecting element 120 may be multifaceted (see, e.g., FIG. 5). In this way, the light reflecting element 120 may reflect visible light in two or more directions. In some implementations, a light reflecting element 120 may be cut, or shaped, en cabochon. In some implementations, each light reflecting element 120 may be cut and/or shaped to be held by a setting 125 (see, e.g., FIG. 4).

As shown in FIGS. 4 and 5, in some implementations, each light reflecting element 120 may be a cubic zirconia (CZ) stone. In some implementations, each light reflecting element 120 may be cut lead glass. In some implementations, each light reflecting element 120 may be any natural or synthetic gemstone (e.g., diamond, ruby, sapphire, emerald, etc.) that can be shaped (e.g., faceted, cut, or otherwise formed) to reflect visible light.

In some implementations, each light reflecting element 120 may be 10 mm in diameter. In some implementations, each light reflecting element 120 may be more than 10 mm in diameter (e.g., 13 mm) or less than 10 mm in diameter (e.g., 5 mm).

In some implementations, each light reflecting element 120 may be translucent, or nearly transparent. In some implementations, each light reflecting element 120 may be any color (e.g., red, green, blue, etc.) or combination of colors suitable for creating a reflected light display.

In some implementations, one or more light reflecting assemblies 115 having a light reflecting element 120 of a first color (e.g., translucent) and one or more light reflecting assemblies 115 having a light reflecting element 115 of a second color (e.g., blue) may be used together to form visible patterns and/or designs on the spherical ornament 100. In some implementations, light reflecting assemblies 115 having light reflecting elements 120 of a third color, a fourth color, etc. may be used to form visible patterns and/or designs on the spherical ornament 100 which require the use of three or more colors.

As shown in FIGS. 4 and 5, in some implementations, each setting 125 may include a plurality of prongs 127 configured to secure about a light reflecting element 120. In this way, the light reflecting element 120 may be held by the setting 125 (see, e.g., FIG. 4). In some implementations, each setting 125 may be configured in any manner suitable to hold any size and/or shape of light reflecting element 120 contemplated herein (e.g., a bezel setting, a bead setting, etc.). In some implementations, an adhesive may be used to secure a light reflecting element 120 to a setting 125.

As shown in FIGS. 4 and 5, in some implementations, the setting 125 may further comprise a post 130 that extends from a bottom side thereof. In some implementations, the post 130 is configured to be inserted into the body portion 105 of the spherical ornament 100 (see, e.g., FIGS. 6 and 9). In some implementations, the post 130 may be an elongated cylindrical member that extends from the bottom side of the setting 125. In some implementations, the distal end of the post 130 is pointed (see, e.g., FIG. 5). In this way, the post 130 may be used to puncture the exterior of the body portion 105 (see, e.g., FIG. 9).

Figure 3:
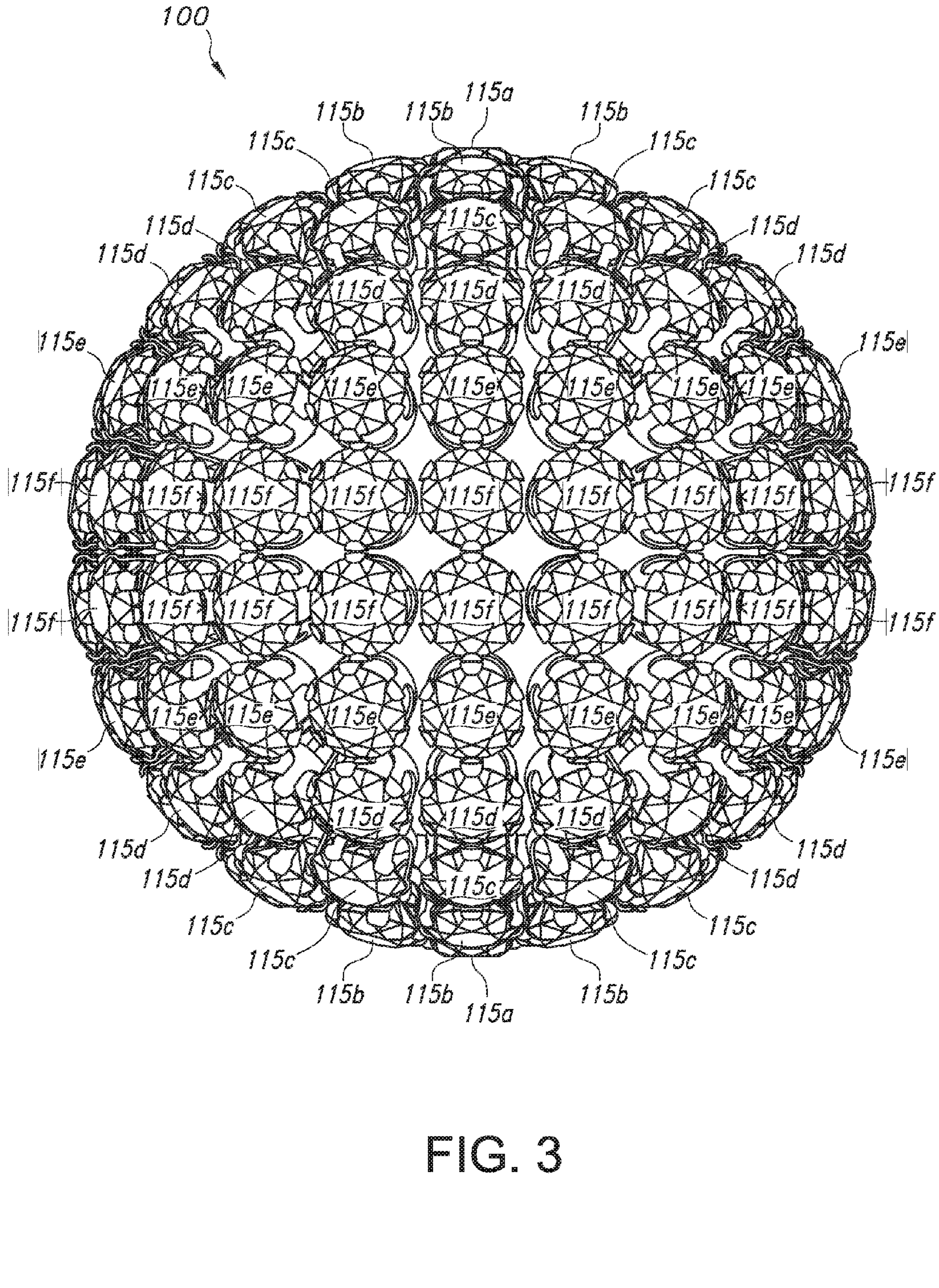
FIG. 3 illustrates a side view of the spherical ornament shown in FIG. 1.

As shown in FIGS. 1 and 3, in some implementations, the top half of the spherical ornament 100 may have a first light reflecting assembly **115*a* mounted in the center thereof. In some implementations, on the top half of the body portion 105, several (e.g., five) concentric rings of light reflecting assemblies 115*b*, 115*c*, 115*d*, 115*e*, 115*f* may be positioned about the first light reflecting assembly 115*a* and mounted on the body portion 105 (see, e.g., FIG. 1). In some implementations, as the distance between the first light reflecting assembly 115*a* and a particular concentric ring of light reflecting assemblies increases, the diameter of the concentric ring of light reflecting assemblies increases (see, e.g., FIG. 1**).

As shown in FIG. 1, in some implementations, positioned about the first light reflecting assembly **115*a* on the top side of the body portion 105, there may be a first concentric ring comprised of six (6) light reflecting assemblies 115*b*, a second concentric ring comprised of eleven (11) light reflecting assemblies 115*c*, a third concentric ring comprised of sixteen (16) light reflecting assemblies 115*d*, a fourth concentric ring comprised of nineteen (19) light reflecting assemblies 115*e*, and a fifth concentric ring comprised of twenty-one (21) light reflecting assemblies 115*f***.

In some implementations, light reflecting assemblies 115 are positioned on the bottom half of the spherical ornament 100 in an identical, or nearly identical, manner as the light reflecting assemblies 115 positioned on the top half of the spherical ornament 100 (see, e.g., FIG. 3).

As shown in FIG. 3, the fifth concentric ring of light reflecting assemblies **115*f* mounted on the top half of the body portion 105 runs parallel to the fifth concentric ring of light reflecting assemblies 115*f* mounted on the bottom half of the body portion 105. In some implementations, the area between the two concentric rings of light reflecting assemblies 115*f* is the dividing line between the top half and the bottom half of the body portion 105**.

In some implementations, there may be more than five or less than five concentric rings of light reflecting assemblies 115 positioned about a first light reflecting assembly **115*a* on either the top half and/or the bottom half of the body portion 105 of the spherical ornament 100**.

In some implementations, the number of light reflecting assemblies 115 used to form each concentric ring may be increased or decreased based on the diameter of the body portion 105, the diameter and/or size of each light reflecting element 120, and/or the amount of space left between each light reflecting assembly 115 being used to assemble a spherical ornament 100.

In some implementations, one or more of the light reflecting assemblies 115 may be positioned on the body portion 105 of the spherical ornament 100 in a random manner. In some implementations, one or more of the light reflecting assemblies 115 may be positioned on the body portion 105 to form an array. In some implementations, light reflecting assemblies 115 may be positioned on the body portion 105 of the spherical ornament 100 in any manner suitable to produce a desired reflected light display.

Figure 9:
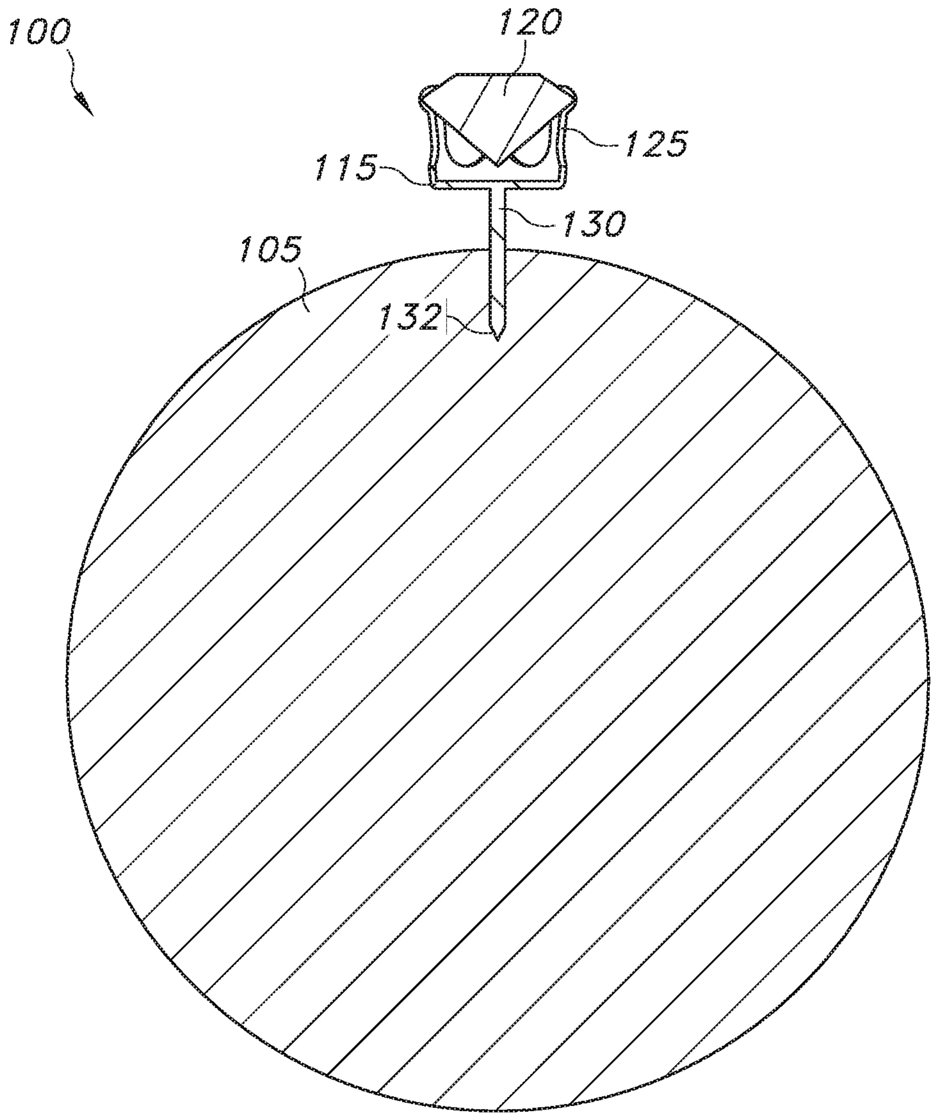
FIG. 9 illustrates a cross-sectional view taken along line 9-9 of FIG. 6.

FIGS. 6, 7, and 9 illustrate how a light reflecting assembly 115 is mounted on the body portion 105 of a spherical ornament 100. First, a light reflecting assembly 115 is positioned over the exterior surface of the body portion 105 in a desired location (see, e.g., FIG. 7). Then, the post 130 is pressed into the exterior surface of the body portion 105 (see, e.g., FIG. 9). In this way, the light reflecting assembly 115 may be mounted on the body portion 105 of the spherical ornament 100 (see, e.g., FIG. 6).

FIG. 1 illustrates a top view of a spherical ornament 100 that has been assembled according to the principles of the present disclosure. In order to assemble the spherical ornament 100, in some implementations, a first light reflecting assembly **115*a* may be positioned on and then mounted to the body portion 105 by pressing the post 130 thereof into the working surface of the body portion 105 (see, e.g., FIGS. 6 and 7). In this way, the position of the first light reflecting assembly 115*a*, about which the concentric rings of light reflecting assemblies 115*b*, 115*c*, 115*d*, 115*e*, 115*f*** are positioned, is selected.

Then, in some implementations, six light reflecting assemblies **115*b* are positioned in a ring-like formation about the first light reflecting assembly 115*a* to form the first concentric ring (see, e.g., FIG. 1). The post 130 of each light reflecting assembly 115*b* is then pressed into the working surface of the body portion 105. In this way, each light reflecting assembly 115*b* may be mounted on the body portion 105 of the spherical ornament 100**.

Next, in some implementations, eleven light reflecting assemblies **115*c* are positioned in a ring-like formation about the first concentric ring of light reflecting assemblies 115*b* to form the second concentric ring (see, e.g., FIG. 1). The post 130 of each light reflecting assembly 115*c* is then pressed into the working surface of the body portion 105. In this way, each light reflecting assembly 115*c* may be mounted on the body portion 105 of the spherical ornament 100**.

Then, in some implementations, sixteen light reflecting assemblies **115*d* are positioned in a ring-like formation about the second concentric ring of light reflecting assemblies 115*c* to form the third concentric ring (see, e.g., FIG. 1). The post 130 of each light reflecting assembly 115*d* is then pressed into the working surface of the body portion 105. In this way, each light reflecting assembly 115*d* may be mounted on the body portion 105 of the spherical ornament 100**.

Next, in some implementations, nineteen light reflecting assemblies **115*e* are positioned in a ring-like formation about the third concentric ring of light reflecting assemblies 115*d* to form the fourth concentric ring (see, e.g., FIG. 1). The post 130 of each light reflecting assembly 115*e* is then pressed into the working surface of the body portion 105. In this way, each light reflecting assembly 115*e* may be mounted on the body portion 105 of the spherical ornament 100**.

Then, in some implementations, twenty-one light reflecting assemblies **115*f* are positioned in a ring-like formation about the fourth concentric ring of light reflecting assemblies 115*e* to form the fifth concentric ring (see, e.g., FIG. 1). The post 130 of each light reflecting assembly 115*f* is then pressed into the working surface of the body portion 105. In this way, each light reflecting assembly 115*f* may be mounted on the body portion 105 of the spherical ornament 100**.

In this way, as shown in FIG. 1, light reflecting assemblies 115 may be positioned on the top half of the spherical ornament 100.

To then position and mount light reflecting assemblies 115 on the bottom half of the spherical ornament 100, in some implementations, a first light reflecting assembly **115*a* is positioned on the body portion 105 opposite the first light reflecting assembly 115*a* positioned on the top half of the spherical ornament 100 (see, e.g., FIG. 3). The post 130 of the first light reflecting assembly 115*a* is then pressed into the working surface of the body portion 105**.

Then, following the steps described above, a first concentric ring of light reflecting assemblies **115*b*, a second concentric ring of light reflecting assemblies 115*c*, a third concentric ring of light reflecting assemblies 115*d*, a fourth concentric ring of light reflecting assemblies 115*e*, and a fifth concentric ring of light reflecting assemblies 115*f* are positioned about the first light reflecting assembly 115*a* mounted on the bottom half of the body portion 105. Each light reflecting assembly 115 is mounted by pressing the post thereof into the working surface of the body portion 105**.

To remove a light reflecting assembly 115 from the body portion 105 of the spherical ornament 100, grasp the desired light reflecting assembly 115 and withdraw the post 130 thereof from the body portion 105. The withdrawn light reflecting assembly 115 may be put aside for later use, discarded, and/or repositioned on the body portion 105 as desired.

Figure 10:
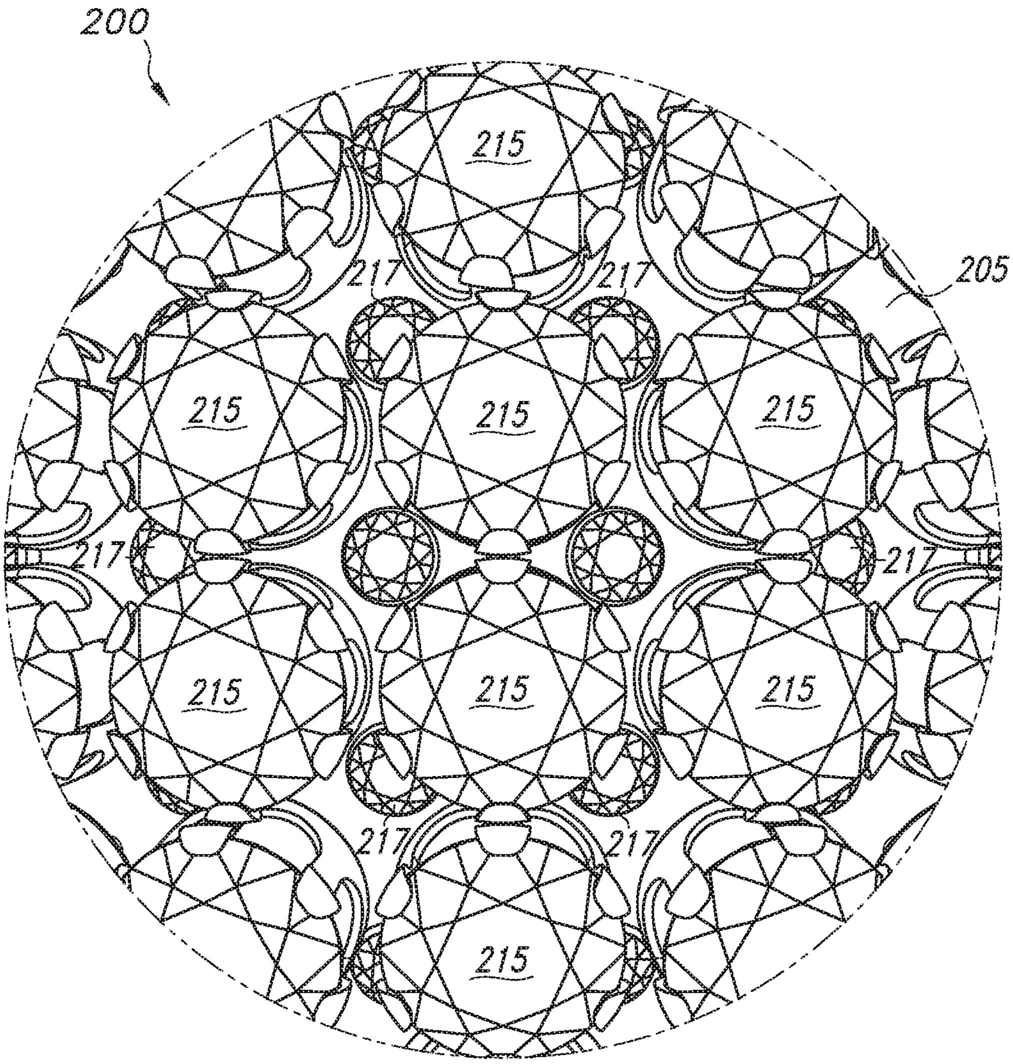
FIG. 10 illustrates an enlarged side view of another implementation of the spherical ornament according to the principles of the present disclosure.
Figure 11:
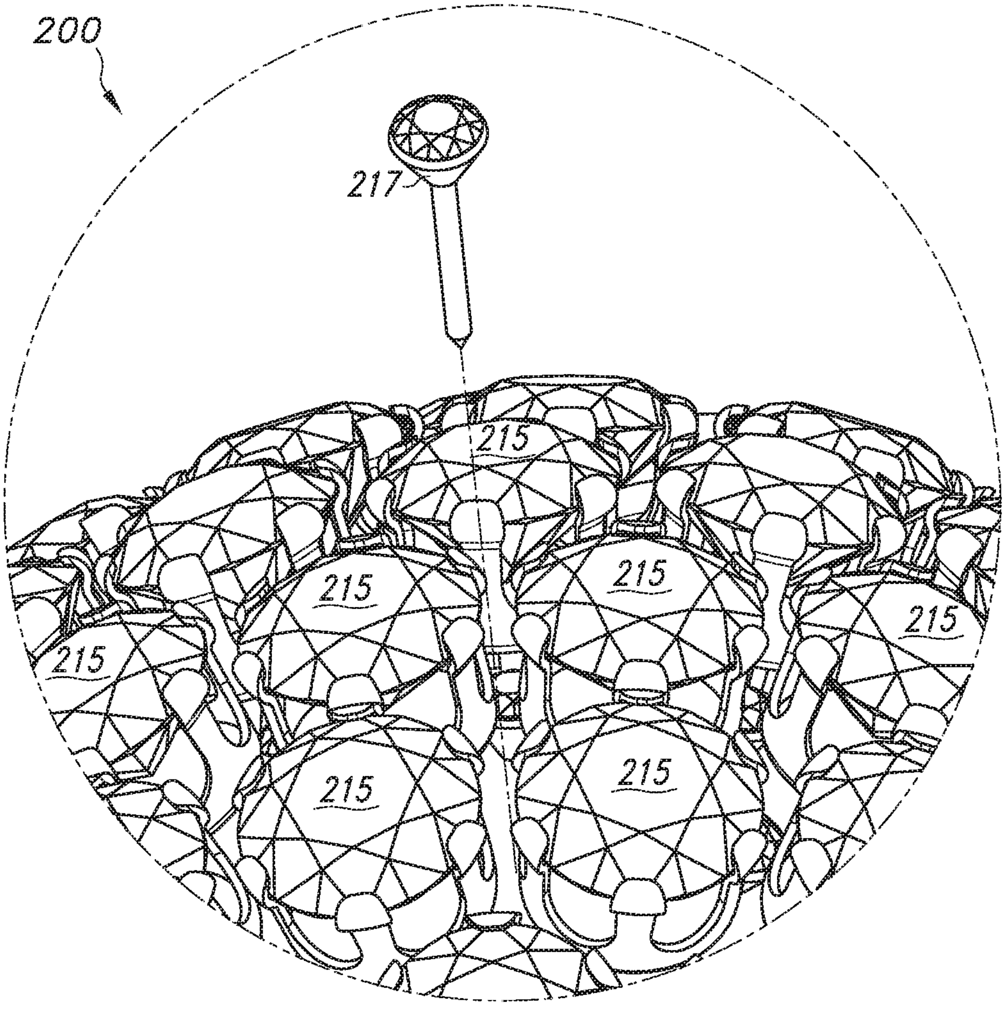
FIG. 11 illustrates an enlarged isometric view of the spherical ornament shown in FIG. 10 with one secondary light reflecting assembly exploded therefrom.

FIGS. 10 and 11 illustrate enlarged views of another example implementation of the spherical ornament 200 in accordance with the present disclosure. The spherical ornament 200 is similar to the spherical ornament 100 discussed above but further comprises one or more secondary light reflecting assemblies 217. In some implementations, the one or more secondary light reflecting assemblies 217 may be used to further accent the spherical ornament 200 and/or to create designs and/or patterns thereon.

In some implementations, the secondary light reflecting assemblies 217 may be constructed in the same or similar manner as the light reflecting assemblies 115 discussed above. In some implementations, the light reflecting assemblies 215 are a first size and the secondary light reflecting assemblies 217 are a second size. In some implementations, the secondary light reflecting assemblies are smaller in diameter and/or size relative to the other light reflecting assemblies 215 being used to construct the spherical ornament 200 (see, e.g., FIG. 10).

As shown in FIG. 10, in some implementations, a secondary light reflecting assembly 217 may be positioned in a gap left between two or more of the larger light reflecting assemblies 215. In this way, the secondary light reflecting assembly 217 may be used to further accent the spherical ornament 200.

In some implementations, a spherical ornament 100, 200 may be provided to a user as a self-assemble kit comprised of a spherical body portion 105, 205, a plurality of light reflecting assemblies 115, 215, and/or a plurality of secondary light reflecting assemblies 217.

In some implementations, each light reflecting assembly 115, 215, 217 may be removed and replaced by a user. In this way, the spherical ornament 100, 200 is easily repaired, cleaned, and/or reconfigured to have a different look (e.g., a different design and/or pattern thereon).

In some implementations, a spherical ornament 100, 200 may be used as a decorative enhancement (e.g., resting in the mouth of a decorative dragon or in the hands of a statue). In some implementations, the spherical ornament 100, 200 may be configured/adapted for suspension (e.g., from a string or chandelier). In some implementations, the spherical ornament 100, 200 may be configured to resemble a pearl and positioned in the center of a lotus blossom.

In some implementations, the spherical ornament 100, 200 could be viewed like a sophisticated, or highly evolved, colorful crystal ball.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A spherical ornament comprising:

a spherical body portion having a solid exterior surface comprised of a resilient material having self-healing properties; and a plurality of light reflecting assemblies, each light reflecting assembly is comprised of a light reflecting element that is held by a setting, the setting includes a post extending from a bottom side thereof that is configured to be inserted into the solid exterior surface of the spherical body portion;

wherein the plurality of light reflecting assemblies are mounted on the spherical body portion.

2. The spherical ornament of claim 1, wherein the resilient material of the spherical body portion has sufficient depth to grip and retain the post of each setting inserted therein and has shock absorbing and impact resistant properties.

3. The spherical ornament of claim 1, wherein the light reflecting element of each light reflecting assembly is multifaceted.

4. The spherical ornament of claim 3, wherein the setting of each light reflecting assembly includes a plurality of prongs that are configured to secure about the light reflecting element.

5. The spherical ornament of claim 4, wherein the light reflecting element of each light reflecting assembly is a cubic zirconia stone.

6. The spherical ornament of claim 1, wherein a top half of the spherical body portion includes a first light reflecting assembly positioned in the center thereof and at least one concentric ring of light reflecting assemblies positioned about the first light reflecting assembly; and a bottom half of the spherical body portion includes a first light reflecting assembly mounted in the center thereof and at least one concentric ring of light reflecting assemblies positioned about the first light reflecting assembly.

7. The spherical ornament of claim 6, wherein the top half of the spherical body portion includes five concentric rings of light reflecting assemblies positioned about the first light reflecting assembly thereon and the bottom half of the spherical body portion includes five concentric rings of light reflecting assemblies positioned about the first light reflecting assembly thereon.

8. The spherical ornament of claim 6, wherein the light reflecting element of each light reflecting assembly is multifaceted.

9. The spherical ornament of claim 8, wherein the setting of each light reflecting assembly includes a plurality of prongs that are configured to secure about the light reflecting element.

10. The spherical ornament of claim 9, wherein the light reflecting element of each light reflecting assembly is a cubic zirconia stone.

11. The spherical ornament of claim 1, wherein the plurality of light reflecting assemblies include one or more light reflecting assemblies of a first size and one or more light reflecting assemblies of a second size.

12. A method for assembling a spherical ornament, the method comprising:

providing a spherical body portion having a solid exterior surface comprised of a resilient material having self-healing properties; and mounting a plurality of light reflecting assemblies onto the spherical body portion, each light reflecting assembly is comprised of a light reflecting element that is held by a setting, the setting includes a post extending from a bottom side thereof that is configured to be inserted into the solid exterior surface of the spherical body portion.

13. The method of claim 12, wherein mounting the plurality of light reflecting assemblies comprises:

positioning a first light reflecting assembly in the center of a top half of the spherical body portion;

positioning at least a first concentric ring of light reflecting assemblies about the first light reflecting assembly on the top half of the spherical body portion;

positioning a first light reflecting assembly in the center of a bottom half of the spherical body portion; and positioning at least a first concentric ring of light reflecting assemblies about the first light reflecting assembly on the bottom half of the spherical body portion.

14. The method of claim 12, wherein the plurality of light reflecting assemblies include one or more light reflecting assemblies that include a first size of light reflecting element and one or more light reflecting assemblies that include a second size of light reflecting element, the method further comprising:

positioning the one or more light reflecting assemblies that include the first size, of light reflecting element on the spherical body portion; and positioning the one or more light reflecting assemblies that include the second size of light reflecting element on the spherical body portion.

15. A spherical ornament comprising:

a spherical body portion, the spherical body portion is a single unitary piece of resilient material having self-healing properties; and a plurality of light reflecting assemblies, each light reflecting assembly is comprised of a light reflecting element that is held by a setting, the setting includes a post extending from a bottom side thereof that is configured to be inserted into the spherical body portion;

wherein the plurality of light reflecting assemblies are mounted on the spherical body portion.

16. The spherical ornament of claim 15, wherein the resilient material of the spherical body portion has sufficient depth to grip and retain the post of each setting inserted therein and has shock absorbing and impact resistant properties.

17. The spherical ornament of claim 15, wherein the light reflecting element of each light reflecting assembly is multifaceted.

18. The spherical ornament of claim 17, wherein the setting of each light reflecting assembly includes a plurality of prongs that are configured to secure about the light reflecting element.

19. The spherical ornament of claim 18, wherein the light reflecting element of each light reflecting assembly is a cubic zirconia stone.

20. The spherical ornament of claim 15, wherein a top half of the spherical body portion includes a first light reflecting assembly positioned in the center thereof and at least one concentric ring of light reflecting assemblies positioned about the first light reflecting assembly; and a bottom half of the spherical body portion includes a first light reflecting assembly mounted in the center thereof and at least one concentric ring of light reflecting assemblies positioned about the first light reflecting assembly.

* * * * *